N. J. ANDERSON.
OXYGEN GENERATOR.
APPLICATION FILED MAY 13, 1911.
1,038,065.
Patented Sept. 10, 1912.
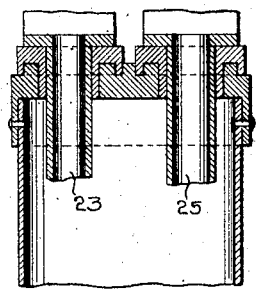
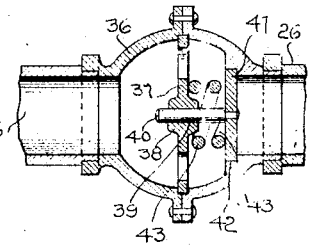
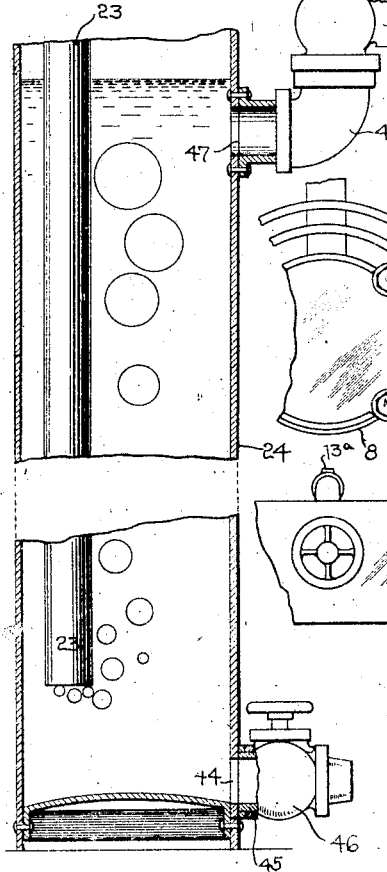
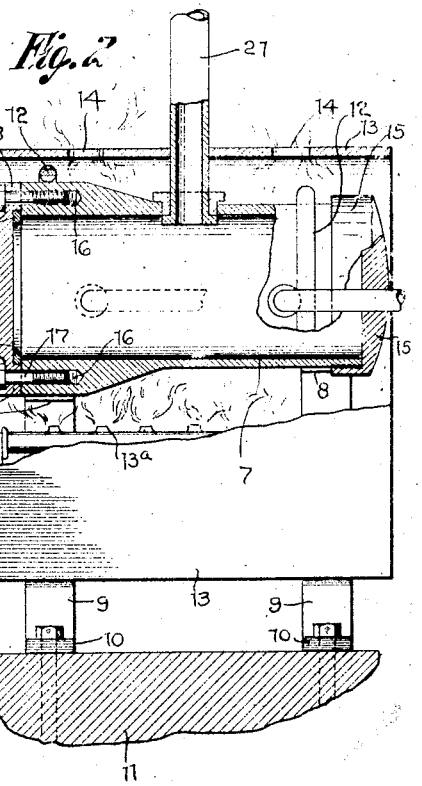
WITNESSES
Robert M. Sutphen
H. Jacob Doyle
INVENTOR
NEWTON J. ANDERSON.
By E. C. Groomer, his Attorney

UNITED STATES PATENT OFFICE.

NEWTON J. ANDERSON, OF COFFEYVILLE, KANSAS.

OXYGEN-GENERATOR.

1,038,065.  Specification of Letters Patent.  Patented Sept. 10, 1912.

Application filed May 13, 1911. Serial No. 627,016.

*To all whom it may concern:*

Be it known that I, NEWTON J. ANDERSON, a citizen of the United States of America, residing at Coffeyville, in the county of Montgomery and State of Kansas, have invented certain new and useful Improvements in Oxygen-Generators, of which the following is a specification, reference being had therein to the accompanying drawing.

This invention relates to the subject of producing gaseous fuels for use in connection with welding and other tools, and the principal object of the same is to provide a producing plant in which oxygen can be cheaply, rapidly and safely generated and delivered to a welding or other tool to be mixed with gas and thereby form the heating fuel for the tool.

In carrying out the objects of the invention generally stated above, it will be understood, of course, that the essential features of the same are necessarily susceptible of changes in details and structural arrangements, one preferred and practical embodiment of which is shown in the accompanying drawings, wherein:—

Figure 1 is a view in end elevation of a portion of the oxygen producing retort. Fig. 2 is a similar side elevation partly in section of the retort. Figs. 3 and 4 are respectively transverse and longitudinal sectional views of a check valve used in connection with the piping from the retort. Figs. 5 and 6 are views respectively of the top and bottom of a washer used in connection herewith, the views being at right angles to each other.

The improved generating plant is of special utility in the production of oxygen for use in connection with the type of welding torches which forms the subject-matter of Letters Patent of the United States No. 976,717 granted to me November 22, 1910.

The oxygen generator comprises a cylindrical retort 7 that is horizontally supported in the concaved seats 8 carried by the arched legs 9 which have their flat bases 10 rigidly fastened to the platform 11. Tie bars 12 encircle the retort 7 and rigidly fasten the same to the seats 8. Transverse bars 12ª connect the legs 9 and serve as supports to retain the burners 13ª, or other source of heat, beneath the retort 7. A hood 13 incloses the retort and the source of heat in spaced relation and is provided with upper openings 14 for the escape of the products of combustion. The rear end of the retort is externally threaded and an internally threaded flanged cap 15 is employed for sealing said rear end. The forward end of the retort 7 has its edge provided with longitudinally-extending threaded openings 16 which are engaged by the bolts 17 that pass through the flange 18 of a cover plate 19 to cause said plate to seal the forward end of the retort. A gasket 20 is interposed between the flange 18 and the forward end of the retort. Retort 7 is provided with a discharge pipe 21 that is fitted gas-tight in its upper portion. Pipe 21 projects through and above hood 13 and its upper end is suitably coupled to a connecting pipe 22 which is in turn coupled to the inlet pipe 23 that enters a washing tank 24 through the top thereof. Tank 24 is preferably cylindrical and the discharge pipe 25 of tank 24 is suitably coupled to a connecting pipe 26 which in turn is coupled to a suitable storage tank or like receptacle not deemed necessary here to be shown.

The pipe 21 is preferably equipped with a check valve for preventing back-flow of the gas. The type of valve employed is shown in detail in Figs. 5 and 6, and by referring thereto it will be seen that said valve comprises a casing 36 provided with a central, transversely-arranged perforated partition 37. Said partition is provided with a reinforced central portion 38 having a guide opening 39 formed through it. A valve stem 40 is slidable through opening 39 and carries a disk, or other type of valve 41 adapted to engage a seat 42 in the inlet end of casing 36. A spring 43 is coiled about stem 40, one end thereof bearing against the valve 41, and the other end bearing against the center of the partition 37. As will be obvious, the tension of spring 43 is being constantly exerted to retain the valve 41 on its seat 42, but the pressure of the incoming oxygen is sufficient to overcome the tension of spring 43 so that the valve is retained open and the oxygen flows through the casing 36. In the event of a backflow of the oxygen, it will be clear that said valve will be quickly seated and thereby seal the inlet end of the casing 36.

Washer tank 24 is provided with a lower clean-out opening 44 from which a discharge tube 45 projects. A controlling valve 46 is provided for the tube 45. Tank 24 is also provided with an upper opening 47 from which a filling tube 48 projects, said tube being provided with a controlling valve 49 and a seat 50 for a funnel 51.

It should be understood that the check valve which I have illustrated in Figs. 3 and 4 is merely a conventional form of a check valve and that any other convenient check valve may be used in place thereof, without departing from the spirit of the invention.

What I claim as my invention is:—

1. A gas producer comprising arched supporting legs provided with concaved seats, an oxygen generating retort seated therein, a cap for sealing one end of said retort, the other end of said retort provided with threaded openings, a sealing plate for said end of the retort provided with a flange, bolts engaging the said flange and openings to lock said plate over said end of the retort, means for heating said retort, and a hood inclosing said retort and heating means and provided with openings for the escape of products of combustion.

2. A gas producer comprising a horizontally arranged cylindrical retort, supporting legs provided with concaved seats for said retort, clamping bars for locking said retort to said seat, means for heating said retort, and a hood covering said retort provided with escape openings for the products of combustion.

In testimony whereof I hereunto affix my signature in presence of two witnesses.

NEWTON J. ANDERSON.

Witnesses:
C. A. STOUT,
W. G. BAILEY.